United States Patent [19]

Morizumi

[11] Patent Number: 5,296,970
[45] Date of Patent: Mar. 22, 1994

[54] ZOOM LENS SYSTEM

[75] Inventor: Masaaki Morizumi, Omiya, Japan

[73] Assignees: Fuji Photo Optical Co., Ltd, Saitama; Fuji Photo Film Co., Inc., Kanagawa, both of Japan

[21] Appl. No.: 39,743

[22] Filed: Mar. 30, 1993

[30] Foreign Application Priority Data

Mar. 30, 1992 [JP] Japan .................. 4-073878

[51] Int. Cl.⁵ .............................. G02B 15/14
[52] U.S. Cl. ...................... 359/700; 359/698; 354/402; 348/345
[58] Field of Search .......... 359/700, 697, 698, 684, 359/823, 689; 354/400, 402, 403, 405, 195.12; 358/227

[56] References Cited

U.S. PATENT DOCUMENTS 4,351,590  9/1982  Hirata et al. .................. 354/403
4,870,439  9/1989  Tsuboi et al. .................. 359/697
5,005,956  4/1991  Kaneda et al. .................. 359/698

Primary Examiner—Loha Ben

[57] ABSTRACT

A compensator lens is driven by a second driving means such that the rear end of the focal depth of an object image at infinity coincides with a surface of image-formation irrespective of the movement of a variable lens when the object image is photographed. With this arrangement, the whole range of the focal depth can be effectively utilized, so that the range of photographing can be enlarged without focussing immediately after the power source is turned on as compared with the conventional zoom lens system. That is, even an object disposed at a close distance can be photographed without focussing as compared with the conventional zoom lens system which can utilize only the substantially half length of the focal depth. Furthermore, even when the object disposed at the closest distance is photographed, focussing can be made in a short period of time as compared with the conventional zoom lens system.

8 Claims, 7 Drawing Sheets (A)

WIDE SIDE

CAM TYPE (B)

TELESCOPIC SIDE

ZOOM LENS SYSTEM

BACKGROUND OF THE INVENTION

1. Field of the Invention

This invention relates to a zoom lens system, and more particularly to a zoom lens system suitable for a video camera.

2. Description of the Related Art

As methods of correcting the movement of focus, the zoom lens system has heretofore included an optical compensation type and a mechanical compensation type.

The optical compensation type is of a type for unifying the movement of movable lenses, in which the mechanism is simplified, however, such disadvantages are presented that the lenses become larger in the whole size and the focussing is easily shifted. In contrast thereto, in the mechanical compensation type, the movable lenses move differently from one another, whereby a cam mechanism is required and the lenses become complicated in construction, however, the focussing is not shifted during the zooming and the lenses can be rendered compact in size. Because of the above-described reasons, the zoom lens system of the mechanical compensation type is most widely used.

In the zoom lens system of the mechanical compensation type, a group of variable lenses is moved to change the focal distance, whereby the shift of focussing caused by the movement of the variable lenses is corrected by the movement of a group of compensator lenses, so that, even the group of variable lenses is moved, the shift of focussing on a surface of image-formation is not caused as a whole.

Furthermore, in recent years, according to the mechanical compensation type, a group of focus lenses is disposed in the rear of the group of compensator lenses, whereby the group of focus lenses is moved, so that the range of photographing is enlarged and an object disposed at the closest distance can be focussed. Incidentally, the group of focus lenses is driven independently of the group of variable lenses and the group of compensator lenses, or a value of delivery thereof is mechanically and electrically controlled on the basis of information of the focal distance.

As shown in FIG. 9, in the conventional zoom lens system, a moving locus of the group 4 of the compensator lenses is regulated such that a light flux 2 of an object at infinity, which falls into a group 1 of variable lenses, can be made to focus at a surface 3 of image-formation, and a home position of a group 5 of focus lenses is such that the above-described light flux 2 can be made to focus at the surface 3 of image-formation.

Accordingly, the conventional zoom lens system utilizes only a range of S1~S2, which is substantially the half length of the focal depth, whereby, the range, within which focussing is made, is narrow when the power source is turned on, and, when an object disposed at a close distance, which is out of the range, is taken, the object is made to focus at a position shifted rearwardly of the rear end S2 of the focal depth. Because of this, the group 5 of focus lenses moves to a position where focussing is made, whereby much time is taken before focussing, thus presenting the disadvantage that the image is blurred during the photographing time.

Even when the image is blurred during the photographing time, if the zoom lens system applicable to the VTR camera for photographing the movie is used, then the image can be edited after taking, thereby presenting no problem. However, when the zoom lens system is applied to the VTR integrated with a camera, in which the image cannot be edited, a special device is required for removing the blurred image.

SUMMARY OF THE INVENTION

The present invention has been developed to eliminate the above-described disadvantages and has as its aim the provision of a zoom lens system, in which focussing can be made in a wide range at the time of power up and an object disposed at the closest distance can be focussed in a very short period of time.

To achieve the above-described aim, the present invention is characterized by comprising: a variable lens for changing the focal distance; a compensator lens for correcting the shift in focussing caused by the movement of the variable lens so as to make focussing at a predetermined surface of image-formation; a first driving means for driving the variable lens in a direction of an optical axis; and a second driving means for driving the compensator lens in the direction of the optical axis and driving the compensator lens in such a manner that, when an object image at infinity is taken, the rear end of the focal depth of the object image coincides with a surface of image-formation.

According to the present invention, the compensator lens is driven by the second driving means in such a manner that, when an object image at infinity is taken, the rear end of the focal depth of the object image coincides with a surface of image-formation. With this arrangement, the whole range of the focal depth can be effectively utilized, so that the range of photographing without focussing immediately after the power up can be enlarged as compared with the conventional zoom lens system. That is, even an object at a close distance can be taken without focussing as compared with the conventional zoom lens system, in which only the substantially half length of the focal depth can be utilized. Furthermore, even when an object at the closest distance is taken, focussing can be made in a short period of time as compared with the conventional zoom lens system.

Furthermore, a home position of the group of focus lenses is set at a position, at which the rear end of the focal depth of the object image coincides with a surface of image-formation. With this arrangement, the whole range of the focal depth can be effectively utilized, so that even an object at a close distance can be taken without focussing as compared with the conventional zoom lens system which utilizes only the substantially half length of the focal depth. Furthermore, even when an object at the closest distance is taken, focussing can be made in a short period of time as compared with the conventional zoom lens system.

Further, when the compensator lens is driven by the second driving means in such a manner that, when an object image at infinity is taken, the rear end of the focal depth of the object image coincides with a surface of image-formation and the home position of the group of focus lenses is set at a position, at which the rear end of the focal depth of the object image coincides with the surface of image-formation, the object at the closest distance can be focussed in a further shorter period of time, so that a zoom lens system having a satisfactory response in focussing can be provided.

BRIEF DESCRIPTION OF THE DRAWINGS

The exact nature of this invention as well as other objects and advantages thereof will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of the zoom lens system according to the present invention with reference to the accompanying drawings.

Figure 1:
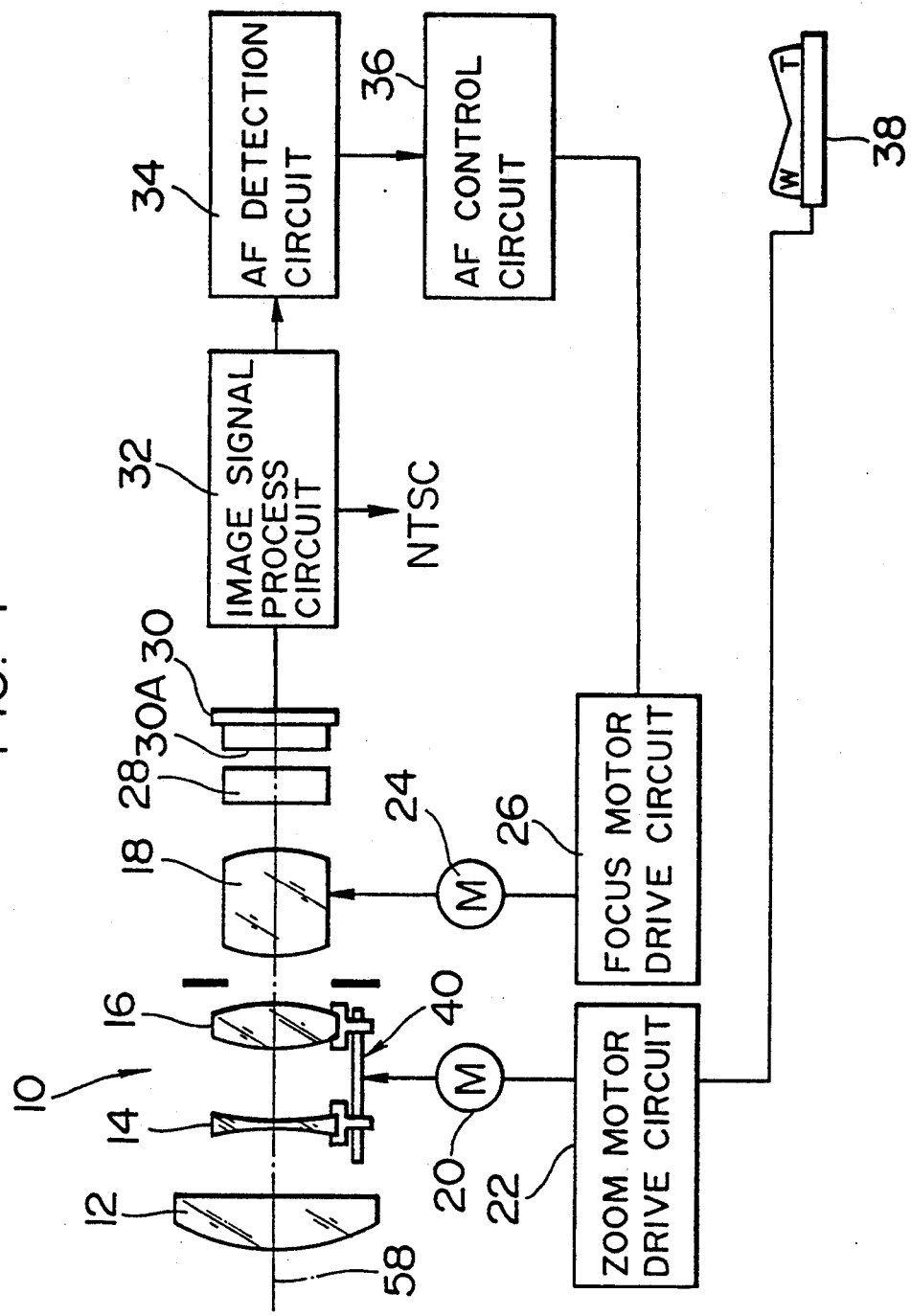
FIG. 1 is a general block diagram showing the zoom lens system according to the present invention.

FIG. 1 is the general block diagram showing a zoom lens system 10 according to the present invention. In this zoom lens system 10, there is provided a front lens 12, and, in the rear thereof, there are disposed a group 14 of variable lenses, a group 16 of compensator lenses and a group 18 of focus lenses in the described order. The front lens 12 is fixed to a lens housing, not shown.

The group 14 of variable lenses and the group 16 of the compensator lenses are moved in a predetermined positional relationship by a side cam tube 40 to be described later, and this side cam tube 40 is driven by a motor 20. The motor 20 is drivably controlled by a zoom motor drive circuit 22. Furthermore, the group 18 of focus lenses is driven by a motor 24 and the motor 24 is drivably controlled by a focus motor drive circuit 26.

The light of an object going out of the group 18 of focus lenses passes through an optical low pass filter 28, has a higher-order frequency component thereof cut away therefrom, and thereafter, is made to focus at a surface 30A of image-formation of a section 30 of image-formation. The light of the object is converted into electric signals in the focus making section 30, and further, converted into NTSC signals in an image signal process circuit 32.

Furthermore, another output from the image signal process circuit 32 is delivered to an AF detection circuit 34, and a detection signal from the AF detection circuit 34 is delivered to an AF control circuit 36. The AF control circuit 36 outputs into the focus motor drive circuit 26.

The AF detection circuit 34 and the AF control circuit 36 constitute an AF control means, and in the case of a contrast detection type for example, the AF control means detects an image signal high frequency component and controls the focus motor drive circuit 26 by a so-called mountain-climbing control (wobble control), and moves the group 18 of focus lenses to lead it to a focussed state.

Furthermore, in order to change the magnification of the object image, the motor 20 is drivably controlled by the zoom motor drive circuit 22 and the side cam tube 40 is rotated, whereby the group 14 of variable lenses and the group 16 of compensator lenses are moved along an optical axis 58.

Figure 2:
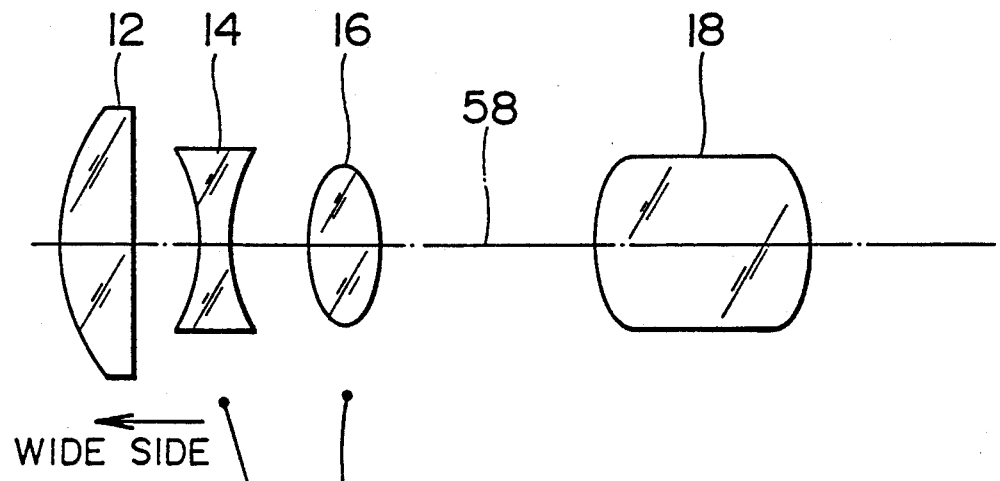
FIG. 2(A) is a side view showing a state in which the group of variable lenses and the group of compensator lenses are moved to the wide side.
FIG. 2(B) is a side view showing a state in which the group of variable lenses and the group of compensator lenses are moved to the telescopic side.
Figure 2:
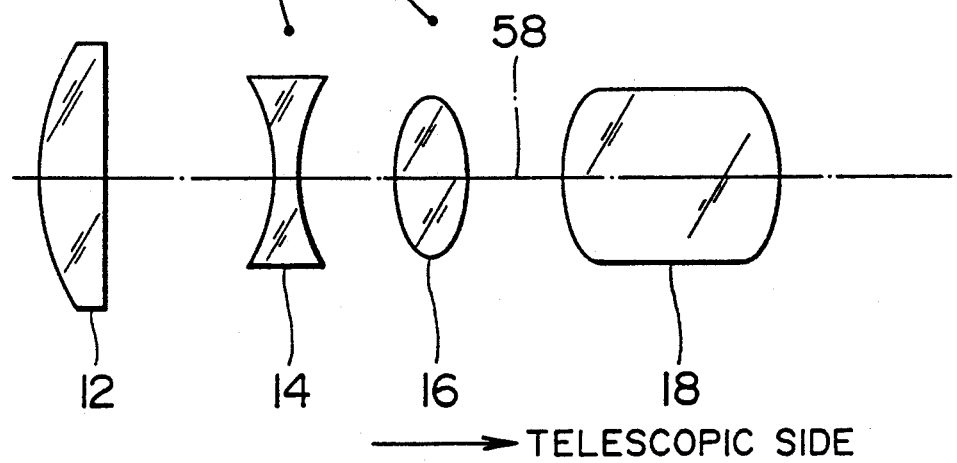

The moving directions and the moving values of the group 14 of variable lenses and the group 16 of compensator lenses are determined by the operation of a telescope-wide switch 38. That is, while the wide side of the telescope-wide switch 38 is being pressed, signals are input into the zoom motor drive circuit 22 to deliver the group 14 of variable lenses and the group 16 of compensator lenses to the wide side as shown in FIG. 2(A). On the other hand, while the telescopic side of the telescope-wide switch 38 is being pressed, signals are input into the zoom motor drive circuit 22 to deliver the group 14 of variable lenses and the group 16 of compensator lenses to the telescopic side as shown in FIG. 2(B).

Figure 3:
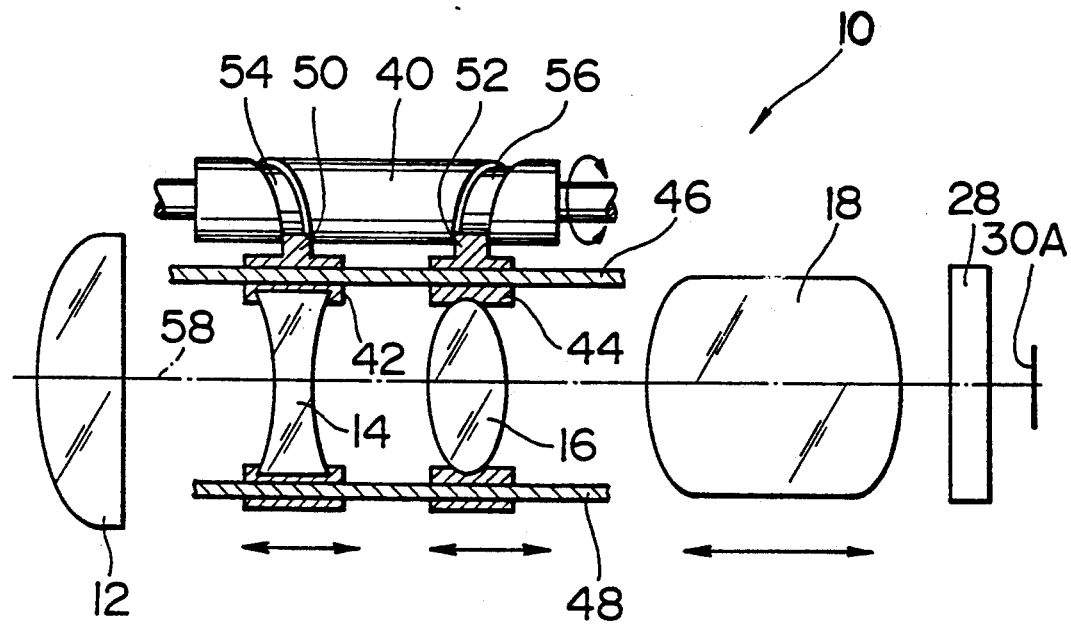
FIG. 3 is a side view of essential portions showing an embodiment of the zoom lens system according to the present invention.

FIG. 3 shows the construction of the zoom lens system 10 in the vicinity of the side cam tube 40 according to the present invention.

The group 14 of variable lenses and the group 16 of compensator lenses are held by lens frames 42 and 44, respectively, and these lens frames 42 and 44 are slidably supported by guide bars 46 and 48. Furthermore, pins 50 and 52 are implanted in the lens frames 42 and 44, and these pins 50 and 52 are coupled into cam grooves 54 and 56, which are formed in the side cam tube 40. With this arrangement, the side cam tube 40 is rotated by the motor 20 shown in FIG. 1, whereby the lens frames 42 and 44 are relatively moved back and forth along the optical axis 58. With this back and forth movement, the group 14 of variable lenses performs a change in magnification and the group 16 of compensator lenses performs correction of the shift in focussing on the surface 30A of image-formation, which is caused by the movement of the group 14 of variable lenses.

Figure 4:
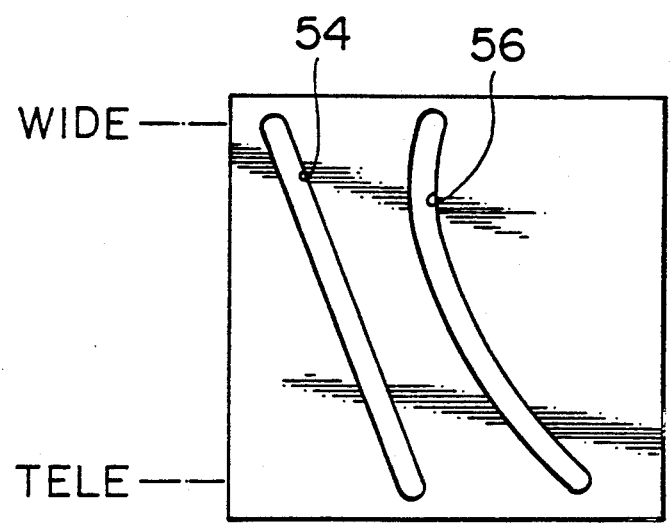
FIG. 4 is an unfolded view showing the cam grooves of the group of variable lenses and the compensator lenses.

FIG. 4 is the unfolded view showing the cam grooves 54 and 56 for the group 14 of variable lenses and the group 16 of compensator lenses.

Figure 5:
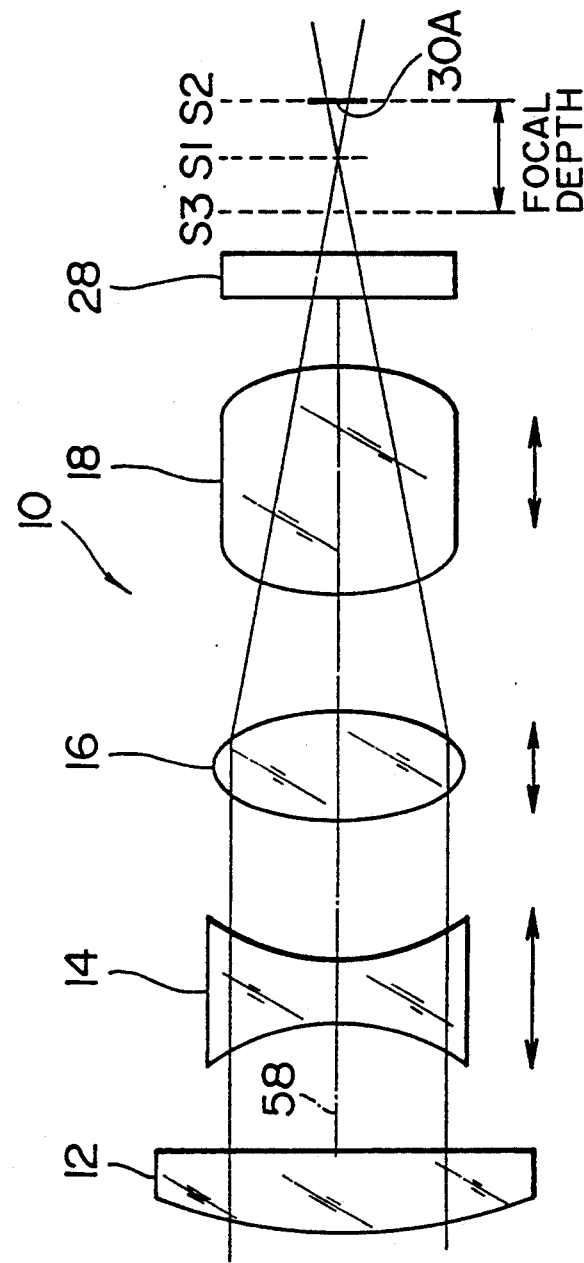
FIG. 5 is a side view showing the position of focus of the zoom lens system according to the present invention.

In FIG. 4, the cam groove 56 of the group 16 of comparator lenses is formed of a locus, in which the rear end S2 of the focal depth of an object image coincides with the surface 30A of image-formation during photographing of the object image at infinity (parallel light) as shown in FIG. 5 irrespective of the movement of the group 14 of variable lenses, which moves along the cam groove 54.

Accordingly, as shown in FIG. 5, in the zoom lens system 10 according to the present invention, the rear end S2 of the focal depth constantly coincides with the surface 30A of image-formation, whereby when an object at infinity is photographed, no focussing is required, and, when an object at a close distance is photographed, if this object is disposed at a position, at which focussing is made in the whole range (S3~S2) of the focal depth, then no focussing is required. Because of this, in the zoom lens system according to the present invention, no focussing is required for the object at a close distance as compared with the conventional zoom lens system utilizing only the substantially half length of the focal depth and photographing can be performed immediately after the power is turned on. Furthermore, even when an object at the closest distance is taken, focussing can be performed in a short period of time as compared with the conventional zoom lens system.

Furthermore, the home position of the group 18 of focus lenses as shown in FIG. 3 is controlled by the focus motor drive circuit 26 in such a manner that, when the power source of the zoom lens system 10 is turned off, the rear end S2 of the focal depth of an object image at infinity returns to a position, at which the rear end S2 coincides with the surface 30A of image-formation during photographing of the object image at infinity.

Figure 6:
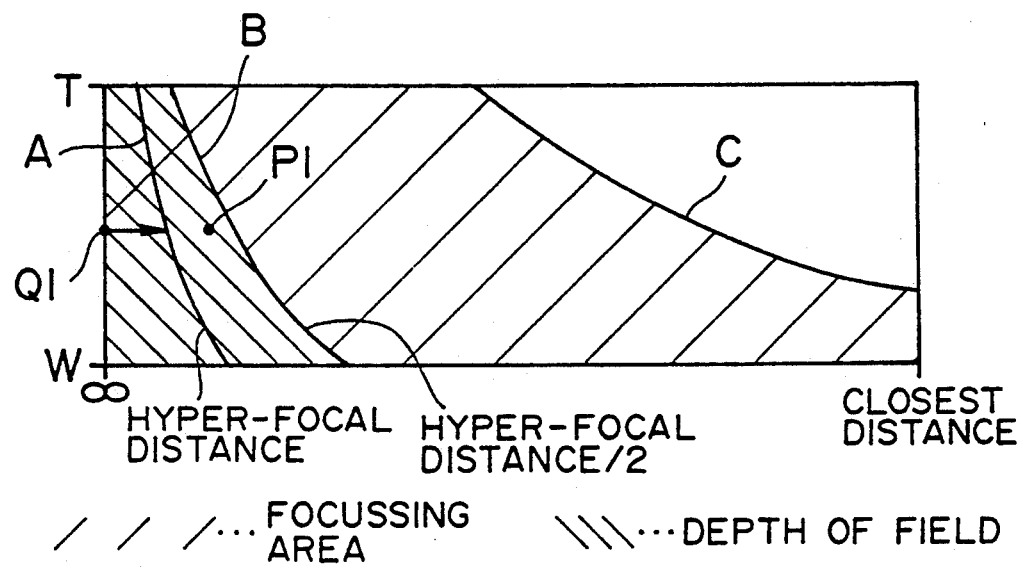
FIG. 6 is an explanatory view of comparison of time required for focussing between the zoom lens system according to the present invention and the conventional zoom lens system.
Figure 7:
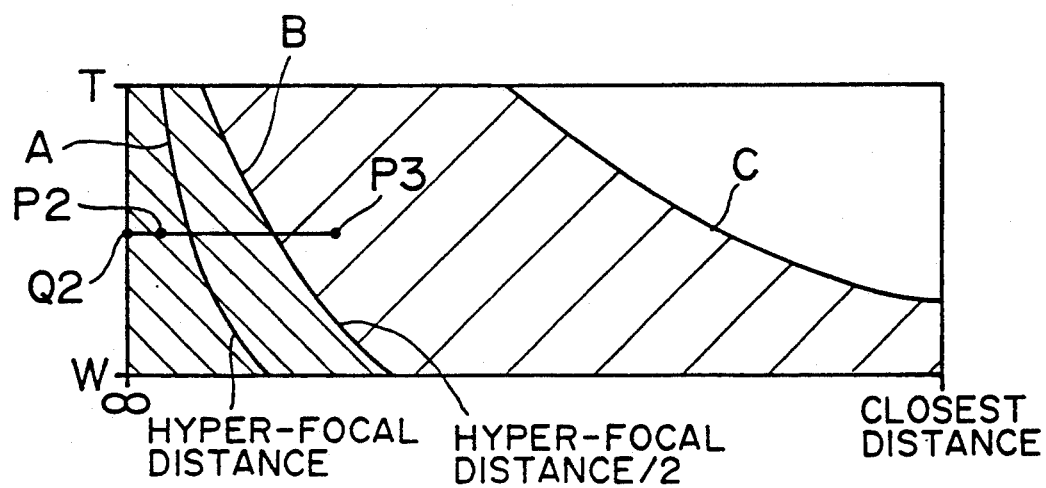
FIG. 7 is an explanatory view of comparison of time required for focussing between the zoom lens system according to the present invention and the conventional zoom lens system.

Next, comparison of time required for focussing between the zoom lens system with the above-described arrangement and the conventional zoom lens system is performed with reference to FIGS. 6 to 7.

An ordinate shown in FIGS. 6 to 7 shows zoom positions, the bottom end indicating a wide end and the top end a telescopic end. Furthermore, an abscissa shows distances of objects from the closest distance to the infinity. Further, a curve A shows the hyper-focal distance of this zoom lens system 10, a curve B shows the near points (the hyper-focal distance /2) of the depth of the object field in the hyper-focal distance, and a curve C shows an area where the focus can be made in this zoom lens system 10.

Firstly, comparison of time required for focussing between the zoom lens system 10 in this embodiment and the conventional zoom lens system is performed with reference to FIG. 6.

The zoom lens system 10 in this embodiment can effectively utilize the whole range (S3~S2) of the focal depth as shown in FIG. 5, so that the far point of the depth of field of the zoom lens system 10 comes to be the infinity and the near point comes to be half the length of the hyper-focal distance. That is, an object disposed at a point P1 in the region of the depth of field as shown in FIG. 6 is photographed immediately after the power source of the zoom lens system 10 is turned on, focussing is not required, because focussing is regarded as having been made.

In contrast thereto, in the conventional zoom lens system, only the substantially half length of the focal depth (S1~S2) is utilized, whereby the far point of the depth of field is at infinity, while, the near point coincides with the hyper-focal distance of this zoom lens system 10. Accordingly, in the conventional zoom lens system, when the object disposed at the point P1 is photographed immediately after the power source is turned on, the group of focus lenses moves to a position of focussing or a position where a point of image-formation enters the focal depth, because this point P1 is out of the region of the depth of field. With this operation, it takes a lot time before focussing, whereby the image is blurred in photographing during this time.

Next, comparison of time required for focussing between the zoom lens system according to this embodiment and the conventional zoom lens system will be made with reference to FIG. 7.

In the zoom lens system 10 according to this embodiment, as described above, the home position of the group 18 of focus lenses is set at a position, at which the rear end S2 of the focal depth of this object image coincides with the surface 30A of image-formation when the object image at infinity is photographed. With this arrangement, when an object disposed at a point P3 out of the region of the depth of field, in this zoom lens system 10, the group 18 of focus lenses may be moved to a position where the near point (curve B) of the depth of field coincides with the point P3.

In contrast thereto, in the conventional zoom lens system, in which the home position is set at a position where focussing coincides with the infinity on the surface of image-formation, the group 18 of focus lenses should move to the near point of the depth of field, i.e. a position where the curve A shown in FIG. 7 coincides with the point P3.

Accordingly, in this zoom lens system 10, even when an object disposed at the closest distance is taken, focussing can be made in a short period of time as compared with the conventional zoom lens system.

Figure 8:
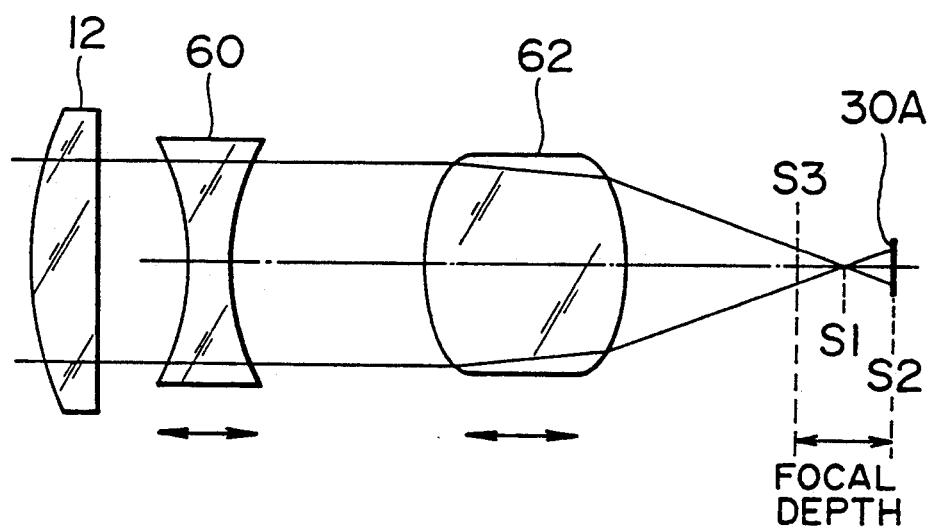
FIG. 8 is a side view showing a second embodiment of the zoom lens system according to the present invention.
Figure 9:
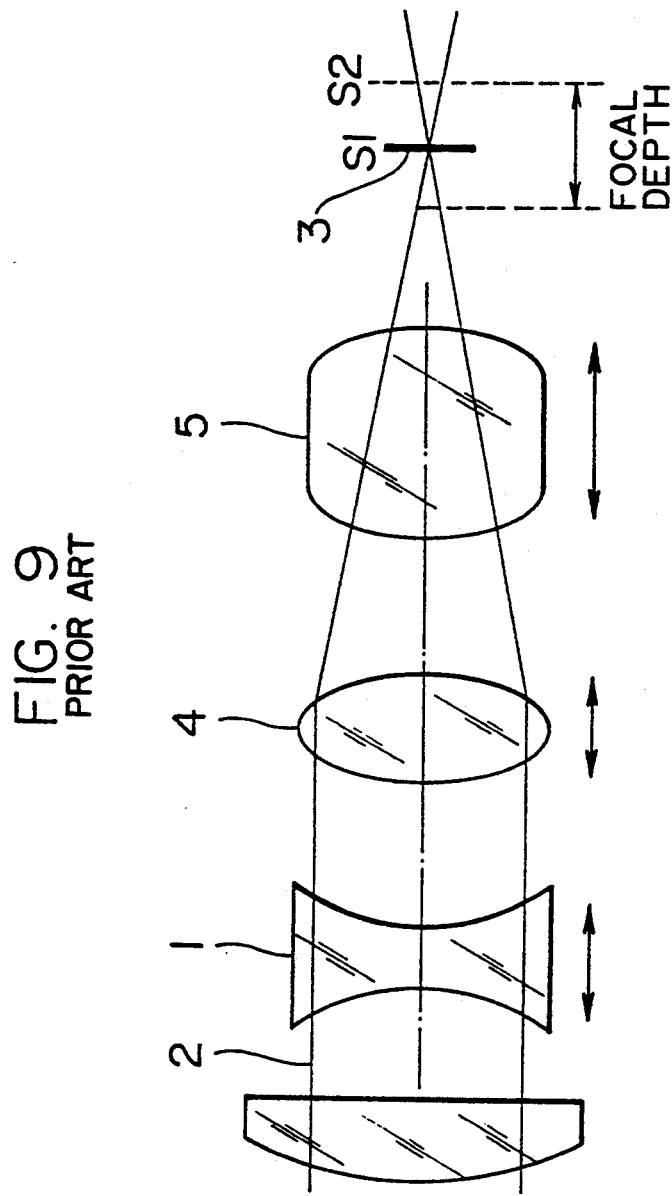
FIG. 9 is a side view showing the position of focus of the conventional zoom lens system.

FIG. 8 shows the second embodiment of the zoom lens system according to the present invention.

As shown in FIG. 8, this zoom lens system comprises a first movable lens 60 for changing the magnification and a second movable lens 62 for correcting the shift of focussing caused by the movement of the first movable lens 60. Similarly to the group 16 of compensator lenses, this second movable lens 62 is drivably controlled in such a manner that, when an object image at infinity is photographed, the rear end S2 of the focal depth of this object image coincides with the surface 30A of image-formation.

With this arrangement, in the zoom lens system shown in the second embodiment also, the whole range of the focal depth can be effectively utilized.

As has been described hereinabove, in the zoom lens system according to the present invention, the compensator lens is driven by the second driving means in such a manner that the rear end of the focal depth of the object image coincides with the surface of image-formation, to thereby effectively utilize the whole range of the focal depth, so that the range, in which photographing can be performed without focussing immediately after the power source is turned on, can be enlarged as compared with the conventional zoom lens system. Furthermore, even when the object disposed at the closest distance is photographed, focussing can be made in a short period of time as compared with the conventional zoom lens system.

Furthermore, the home position of the group of focus lenses is set at the position, at which the rear end of the focal depth of the object image coincides with the surface of image-formation, to thereby effectively utilize the whole range of the focal depth, so that even the object disposed at a close distance can be photographed without focussing as compared with the conventional zoom lens system utilizing only the substantially half length of the focal depth. Furthermore, even when the object disposed at the closest distance is photographed, focussing can be made in a short period of time as compared with the conventional zoom lens system.

Further, at the time of photographing the object image at infinity, if the compensator lens is driven by the second driving means in such a manner that the rear end of the focal depth of this object image coincides with the surface of image-formation and the home position of the focus lenses is set at the position, at which the rear end of the focal depth of the object image coincides with the surface of image-formation, then focussing can be made in a further shorter period of time, so that the zoom lens system having satisfactory response in focussing can be provided.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A zoom lens system comprising:
   a first movable lens for changing a focal distance;
   a second movable lens for correcting the shift of focussing caused by the movement of said first movable lens such that focussing can be made at a predetermined surface of image-formation;
   a first driving means for driving said first movable lens in a direction of an optical axis; and
   a second driving means for driving said second movable lens in the direction of the optical axis and driving said second movable lens such that the rear end of the focal depth of an object image at infinity coincides with the surface of image-formation when the object image is photographed.

2. A zoom lens system comprising:
   a variable lens for changing a focal distance;
   a compensator lens for correcting the shift of focussing caused by the movement of said variable lens such that focussing can be made at a predetermined surface of image-formation;
   a first driving means for driving said variable lens in a direction of an optical axis; and
   a second driving means for driving said compensator lens in the direction of the optical axis and driving said compensator lens such that the rear end of the focal depth of an object image at infinity coincides with said surface of image-formation when said object image is photographed.

3. The zoom lens system as set forth in claim 2, wherein said first driving means and said second driving means are formed by a side cam tube disposed at the sides of said variable lens and said compensator lens.

4. The zoom lens system as set forth in claim 3, wherein said side cam tube is formed with two cam grooves for driving the variable lens and the compensator lens and the cam groove for the compensator lens is formed of a locus, along which the rear end of the focal depth of the object image at infinity coincides with the surface of image-formation when said object image is photographed.

5. A zoom lens system comprising:
   a variable lens for changing a focal distance;
   a compensator lens for correcting the shift of focussing caused by the movement of said variable lens such that focussing can be made at a surface of image-formation;
   driving means for driving said variable lens and said compensator lens in a direction of an optical axis;
   a focus lens for performing a focal adjusting;
   an AF control means for driving said focus lens in the direction of the optical axis such that an object image can be made to focus at the surface of image-formation; and
   a position regulating means for moving said focus lens to a position where the rear end of the focal depth of said object image at infinity coincides with the surface of image-formation during the photographing of the object image, before the start of photographing.

6. A zoom lens system comprising:
   a variable lens for changing a focal distance;
   a compensator lens for correcting the shift of focussing caused by the movement of said variable lens such that focussing can be made at a predetermined surface of image-formation;
   a first driving means for driving said variable lens in a direction of an optical axis;
   a second driving means for driving said compensator lens in the direction of the optical axis and driving said compensator lens such that the rear end of the focal depth of an object image at infinity coincides with the surface of image-formation when the object image is photographed;
   a focus lens for performing a focal adjusting;
   an AF control means for driving said focus lens in the direction of the optical axis such that the object image can be made to focus at the surface of image-formation; and
   a position regulating means for moving said focus lens to a position where the rear end of the focal depth of the focal image at infinity coincides with the surface of image-formation during the photographing of the object image, before the start of photographing.

7. The zoom lens system as set forth in claim 6, wherein said first driving means and said second driving means are formed by a side cam tube disposed at the sides of said variable lens and said compensator lens.

8. The zoom lens system as set forth in claim 7, wherein said cam tube is formed with two cam grooves for driving the variable lens and the compensator lens and the cam groove for the compensator lens is formed of a locus, along which the rear end of the focal depth of the object image at infinity coincides with the surface of image-formation when said object image is photographed.

* * * * *